(12) United States Patent
Schwaiger et al.

(10) Patent No.: US 11,939,725 B2
(45) Date of Patent: Mar. 26, 2024

(54) HOT-EXTRACTION PAPER

(71) Applicant: MONDI AG, Vienna (AT)

(72) Inventors: Elisabeth Schwaiger, St. Stefan (AT); Franz Joebstl, St. Stefan (AT); Reinhard Kainz, Wolfsberg (AT)

(73) Assignee: MONDI AG, Vienna (AT)

( * ) Notice: Subject to any disclaimer, the term of this patent is extended or adjusted under 35 U.S.C. 154(b) by 479 days.

(21) Appl. No.: 17/413,684

(22) PCT Filed: Dec. 11, 2019

(86) PCT No.: PCT/EP2019/084568
§ 371 (c)(1),
(2) Date: Jun. 14, 2021

(87) PCT Pub. No.: WO2020/120535
PCT Pub. Date: Jun. 18, 2020

(65) Prior Publication Data
US 2022/0064867 A1 Mar. 3, 2022

(30) Foreign Application Priority Data
Dec. 14, 2018 (AT) .................. A 374/2018

(51) Int. Cl.
*D21H 27/08* (2006.01)
*D21H 11/20* (2006.01)
*D21H 15/02* (2006.01)
*D21H 25/14* (2006.01)

(52) U.S. Cl.
CPC ............ *D21H 27/08* (2013.01); *D21H 11/20* (2013.01); *D21H 15/02* (2013.01); *D21H 25/14* (2013.01)

(58) Field of Classification Search
CPC ........ B01D 2239/10; B01D 2239/1225; B01D 39/1615; B01D 39/18; B65D 85/8043; D21H 11/00; D21H 11/20; D21H 15/02; D21H 25/14; D21H 27/00; D21H 27/08; D21H 27/10
See application file for complete search history.

(56) References Cited

U.S. PATENT DOCUMENTS

2016/0073689 A1  3/2016  Sebastian et al.

FOREIGN PATENT DOCUMENTS

| EP | 0422898 | 4/1991 |
|---|---|---|
| EP | 1343629 | 3/2005 |
| EP | 1985437 | 10/2008 |
| EP | 2374930 | 10/2011 |
| WO | WO 2017/063680 | 4/2017 |
| WO | WO 2017/144009 | 8/2017 |
| WO | WO 2018/002223 | 1/2018 |

OTHER PUBLICATIONS

International Search Report.

*Primary Examiner* — Dirk R Bass
(74) *Attorney, Agent, or Firm* — Jacobson Holman PLLC

(57) ABSTRACT

A hot-extraction paper consisting substantially of cellulose and manufacturing assistants needed in cellulose and manufacturing assistants needs in cellulose production, such as pH modifiers based on acids and/or bases, the paper comprises exclusively cellulose having fibre lengths of at least 2.0 mm on length-weighted average, more particularly at least 2.5 mm on length-weighted average, and has isotropic extension properties which are substantially equal in machine and cross directions and amount to at least 7.5%, more particularly at least 8.5%.

12 Claims, No Drawings

HOT-EXTRACTION PAPER

BACKGROUND OF THE INVENTION

The present invention relates to a hot-extraction paper consisting substantially of cellulose and manufacturing assistants absolutely needed in cellulose production, such as pH modifiers based on acids and/or bases.

Hot-extraction papers, which are used as coffee filters, tea filters or for other purposes, must in particular satisfy certain requirements when they are used in the food sector. Not only the raw material used, which in the present case is the wood chips or the cellulose, but also the additive materials are standardized exactly and may only be chosen from very few determined substances.

Depending on the chosen purpose, the lists of additive materials here are different and in particular, it is necessary that the total dry residue of the extract after an extraction with hot water does not exceed a quantity of 10 mg/dm$^2$ and in particular additive materials usually used in the production of paper must largely be dispensed with.

In this context, it has been established that the requirements differ depending on the subsequent purpose and that papers, which are suitable for tea preparation for example, cannot be used as cooking bags.

However, in the art, in addition to conventional coffee and tea filters, a plurality of special papers are also known, which can or may be used for example for the production of drinking cups, in which hot coffee or hot tea or soup can be sold. Thus, for example, a method has become known from EP 1 985 437 A1, using which paper is processed to form drinking cups and the like, which paper can be used in the food sector directly after its shaping, for example for hot coffee or hot tea.

EP 1 343 629 B1 also describes a paper container, which is manufactured from a very stretchable kraft paper, and the wall of which has an inwardly or outwardly extending section. The papers described herein are special papers, which are suitable for the construction of containers, which can directly accommodate a hot beverage for example and using which the purchaser cannot injure themselves, i.e. which also have a certain insulating effect.

A portion container for extractable substances for producing a beverage has become known from WO 2018/002223 A1, which container is on the one hand constructed to be aroma-tight and is on the other hand biodegradable.

WO 2017/144009 A1 describes a composite material containing cellulose and at least microfibrillated or nanofibrillated cellulose and products produced from this material.

A method for producing a base paper and the base paper are known from EP 2 374 930 A1, which paper at least contains cellulose from straw and industrial cellulose, for producing writing paper or the like.

In addition to conventional coffee filters, in recent years, the demand for capsules in which the coffee to be brewed is contained has become ever greater, as machines, which can accommodate capsules of this type and therefore prepare coffee or tea, are being used increasingly not only in the industrial market, but rather in particular also in private households. In the case of the use of machines of this type, an excessively large number of waste plastic capsules or metal capsules or capsules made from both materials is generated, which for the most part are currently disposed of or treated as hazardous waste. Owing to the ever increasing problems of plastic wastes, which are found at the most inaccessible locations, such as in the middle of the ocean, plastic should be disposed of in such a manner that it is reused and thus the increasing problems are reduced as far as possible. Metal capsules, particularly aluminium capsules, are extremely expensive and require a high energy outlay during their production, so that there is a requirement for a novel type of containers for coffee machines operating with capsules, using which coffee machines, capsules filled with coffee can be brewed without the waste capsules having to be subjected to a complex reprocessing and without there being a risk to the environment.

SUMMARY OF THE INVENTION

The invention now aims to provide a hot-extraction paper, which is suitable for the production of capsules for coffee machines and which can furthermore also be used safely for the preparation of hot beverages.

To achieve this object, the hot-extraction paper according to the invention is essentially characterized in that the paper comprises cellulose having fibre lengths of at least 2.0 mm on length-weighted average, particularly at least 2.5 mm on length-weighted average, and in that it has isotropic extension properties which are substantially equal in machine direction and cross direction and amount to at least 7.5%, particularly at least 8.5%. In that paper is chosen, which comprises cellulose with fibre lengths of at least 2.0 mm on length-weighted average, particularly at least 2.5 mm on length-weighted average, a paper is successfully produced, the tensile strength or bursting strength of which is increased considerably compared to conventional papers, particularly kraft papers. Furthermore, in that the hot-extraction paper has isotropic extension properties, which are substantially equal in the machine direction and cross direction and amount to at least 7.5%, particularly at least 8.5%, a paper of this type can be shaped or also extended as desired, and it is possible using a paper of this type to achieve the small container shapes needed for capsule machines without tearing or destroying the fibre structure and therefore also to provide a paper which is also dimensionally stable and durable for increased temperatures and pressure.

Cellulose with fibre lengths of at least 2.5 mm on length-weighted average is understood as meaning celluloses, the fibre lengths of which amount to 2.5 mm on average, wherein deviations from the average are as small as possible and preferably not greater than ±0.8 mm, preferably not greater than ±0.4 mm and particularly preferably not greater than ±0.2 mm.

In that a cellulose with length-weighted fibre lengths of at least 2.0 mm on length-weighted average, particularly 2.5 mm on length-weighted average, is used, a fine-material fraction consisting of cellulose fibres with an extremely low fibre length in particular is prevented or suppressed. Using a paper of this type, constant properties in particular are successfully achieved, which are suitable for use e.g. as coffee capsules in capsule machines at higher pressures, without fearing an entrainment of undesired fine material or ballast materials into the beverage produced therewith. In particular, if it is taken into account that very detailed regulations exist for the production of hot beverages, which constituents may have a hot-extraction paper and in particular which quantities of extract from the production auxiliary materials or additive materials may be contained in the end product, it is absolutely clear to a person skilled in the art that the number of additive materials must be limited not only on the basis of legal requirements, but rather it must in particular be ensured that virtually no additives which are not absolutely necessary are contained in the hot-extraction paper and in particular, it is also ensured that no contaminants originating from the cellulose itself can be entrained into the beverage produced therewith.

In particular, the fact that a hot-extraction paper is successfully produced using a modern, fast-running paper machine, which has machine speeds of up to 1000 m/min, in which paper the addition of production auxiliary materials, such as anti-foaming agents, anti-sedimentation agents, starch, fixing agents, sizing agents, fillers or the like is dispensed with, was not foreseeable, as the machine speed could only be increased by adding production auxiliary materials of this type.

According to the invention, the hot-extraction paper is therefore developed so that during its production, only inorganic acids and bases, such as sulphuric acid ($H_2SO_4$) and caustic soda (NaOH) are used as pH modifiers. Here, it is important in particular that the chloride content is kept low, in order to prevent the introduction of easily soluble chloride into the end product by means of the hot water during the extractions. The nitrogen content in the water extract must likewise be limited, as an increased nitrogen content could change the taste of the beverage or the like produced using the hot-extraction paper. Preferably, the nitrogen content in the water extract is therefore limited to <0.015 mg/g dry material.

According to a development of the invention, the cellulose is chosen from cellulose from coniferous woods, chosen from the group fir, spruce, pine, larch and Douglas fir. Coniferous woods are known to have high fibre lengths and are usually used in particular for the production of papers which must have a high tensile strength. According to the invention, at attempt is made to choose a cellulose which is not only length-weighted, but preferably also originates from one and the same wood type or mixtures of two defined wood types, such as e.g. mixtures of spruce and pine.

According to a development of the invention, the cellulose for the hot-extraction paper is chosen in such a manner that up to 15%, preferably up to 10% of the cellulose made up of coniferous woods is replaced by cellulose from deciduous woods, chosen from the group beech, oak, European aspen, poplar, acacia, alder, maple, chestnut, tupelo, plane, lime and eucalyptus or mixtures of two or more thereof. In order to be able to maintain the properties of the hot-extraction paper substantially unchanged, up to 15%, particularly up to 10% of the cellulose from deciduous coniferous trees, can be replaced by cellulose from deciduous trees, which has a lower fibre length than that from coniferous trees. In spite of this replacement, the elongation at break properties in particular of the hot-extraction paper are successfully maintained according to the invention.

According to a development of the invention, the isotropic extension properties of the paper are chosen in such a manner that the elongation at break in the machine direction (MD) deviates at most by 1.5% from that in the cross direction (CD). Using such an isotropic extension behaviour, it is possible to ensure that even in the case of the shaping of, for example, capsules from papers of this type, an undesired weakening and thus changing of the material properties in one direction can be prevented with certainty.

A hot-extraction paper of this type according to the invention can, as corresponds to a development, have weights per unit area of between 70 and 250 g/m². Here, the weight per unit area is chosen depending on the pressure to be applied during the extraction or duration of the application and often lies in the range of approximately 80-150 g/m².

In order to be suitable for all requirements for an extraction of foods or luxury foods, according to a development of the invention, the hot-extraction paper is chosen in such a manner that a chloride content of a hot-water extract from the hot-extraction paper is below 0.7 mg/l and an aluminium content of a hot-water extract from the hot-extraction paper is below 0.1 mg/l. In particular, the lowering of the aluminium content originating from auxiliary agents, like the low chloride content enable a use of the hot-extraction paper in the field of food and luxury foods.

In order, during the application of hot water or steam and pressure, reliably to prevent the hot-extraction paper from tearing or being loaded such that too much material is entrained or the same is no longer leak-tight, the invention is developed in such a manner, characterized in that it has a burst resistance of at least 630 kPa/100 g.m$^{-2}$, 790 kPa/130 g.m$^{-2}$ or 1020 kPa/180 g.m$^{-2}$. If, as is possible according to the invention, the hot-extraction paper has a deciduous wood portion, the burst resistance falls as a function of the quantity and the type of the admixed deciduous wood, without the other properties being substantially influenced however. According to a development of the invention, a hot-extraction paper of this type, the hot-extraction paper having a deciduous wood portion, has a burst resistance of at least 400 kPa/100 g.m$^{-2}$, 520 kPa/130 g.m$^{-2}$ or 630 kPa/180 g.m$^{-2}$.

In order reliably to maintain or achieve the desired creping of a paper of this type in particular, the hot-extraction paper is developed such that it is compressed and, if appropriate, additionally calendered, particularly compressed in a Clupak plant and calendered in a calender, a shoe calender in particular. In the case of the compression of the hot-extraction paper in the Clupak machine, in which the paper is compressed between a rubber blanket and a cylinder in a manner known per se, the speed in the pre-dryer section is chosen to be different from that in the post-dryer section for the hot-extraction paper according to the invention, wherein the speed in the pre-dryer section is chosen to be greater than that in the post-dryer section. With respect to the isotropic extension behaviour of the hot-extraction paper according to the invention, an extensibility of approximately 2% in the machine direction is achieved here by the celluloses used. Additional extension values in the machine direction are achieved exclusively due to the specific mode of operation of the Clupak machine. Thus, in the pre-drying phase using the Clupak machine, at least 5.5% was additionally successfully achieved in the machine direction in addition to the extension of the fibres if the machine is run with a speed of 850 m/min in the pre-drying phase and 803 m/min in the post-drying phase. The extension in the cross direction is achieved according to the invention by high-consistency milling, in which the cellulose pulp with a consistency of at least 25% solids is subjected to a mechanical treatment in a milling gap.

The facultative step of the calender, particularly by means of a shoe calender, allows a smoothing of the previously creped surface of the hot-extraction paper, without the bursting strength or the tensile strength being disadvantageously influenced at the same time. The choice of a shoe length of for example 50 to 170 mm in the shoe calender, nip pressures of up to 10 Mpa, a surface temperature of the calender roller of up to 280° C. and also applied steam quantities of up to 3 g/m², which are applied just prior to the calender gap, positively affect the desired smoothing behaviour.

According to a development of the invention, a sulphate-cooked unbleached cellulose was used for the hot-extraction paper. In that unbleached cellulose is used, the use of bleaching agents which would otherwise be necessary is avoided, which overall improves the suitability of the hot-extraction paper as a capsule in a capsule coffee machine considerably.

Finally, in order for example to prevent water absorption of a hot-extraction paper of this type and thus a moistening of the product contained therein reliably and/or to ensure a corresponding aroma protection, the invention may be developed such that the paper is constructed in a coated manner. In order to ensure that at least one coating which is, if appropriate, to be applied onto the hot-extraction paper adheres well to the hot-extraction paper according to the invention and is not inadvertently detached, according to a development of the invention, the surface energy of the paper is set at >33 mJ/m², preferably >35 mJ/m², particularly preferably >38 mJ/m². The surface energy is here understood as meaning the sum of polar and dispersive fractions in the paper and in near-surface layers of the paper. The difference between the top side and the wire side of the paper with regards to the surface energies amounts to preferably 3 mJ/m², particularly preferably 2 mJ/m². As a result, it can be ensured that both sides of the paper behave equally in the case of a coating to be applied and the coatings are not e.g. inadvertently detached on one side. The surface energy of the hot-extraction paper results from the celluloses used and the absolutely necessary manufacturing assistants on the paper machine. Its setting is therefore possible e.g. by means of the choice of the cellulose.

A coating of the hot-extraction paper can for example take place by one of the following methods chosen from lamination, lining or extrusion coating or lining. The coating materials to be used for the formation of coatings of this type are mainly plastics which satisfy the legal food safety regulations for hot extraction, as even the entire composite of hot-extraction paper and coating(s) must comply with these legal food safety regulations. Plastics which are also biodegradable or compostable, such as e.g. polylactic acid or polyvinyl alcohols, are particularly preferred. However, other respectively corresponding materials, such as e.g. polyethylene or polypropylene, may also be used. One or both sides of the hot-extraction paper can be coated and for each side of the paper, a different number and type of plastics or materials can be used for the coating. Corresponding layer thicknesses are to be adapted to the respective materials and further desired barrier properties and amount to between 5 and 25 µm, particularly 7 to 20 µm per layer and are in total not thicker than approximately 50 µm.

It is not necessary to state that the hot-extraction paper can be used bleached or preferably unbleached.

Preferably, the hot-extraction paper can be used in a method for producing closed capsules for tea and/or coffee preparation. For a use of this type an inadvertent tearing of the paper during shaping and during use can be prevented, owing to its isotropic extension properties.

DETAILED DESCRIPTION OF THE INVENTION

The invention is explained in more detail in the following on the basis of exemplary embodiments. With respect to the measured values used for the description of the properties of the products produced, it is to be stated that for the following, standards were called upon for their measurement or determination and that the same are not listed separately again in the following:

| | |
|---|---|
| Fibre length | ISO 16065-2: 20014 |
| Bursting strength | ISO 2758: 2014 |
| Extension | ISO 1924-3: 2005 |
| Grammage | ISO 536: 2012 |
| Air permeability according to Gurley | ISO 5636-5: 2013 |
| Hot water extract | ISO 6588-2: 2012 |

Example 1

Production of a first hot-extraction paper according to the invention

Unbleached kraft sulphate cellulose, which was produced exclusively from 80% to 81% spruce and 19% to 20% pine wood with a Kappa number of 45, was used for producing the hot-extraction paper. 98% sulphuric acid was used exclusively to lower and set the pH value on a sack paper machine, which is run in a pseudo-neutral manner and with a maximum speed of >1000 m/min, and which was operated in particular for producing the hot-extraction paper at approximately 504 m/min. The resultant white water has a pH of 6.2 to approximately 7.5. Chemicals which are usually used in paper production, such as alum, starch, anti-sedimentation agents, anti-foaming agents, talc or sizing agents, must not be used and the corresponding additive openings of the machine are closed at least one hour before the production of the hot-extraction paper, in order reliably to prevent any residual quantities of these materials in the paper to be produced. Likewise, residual fibres are displaced to a different paper machine or to different reject containers, in order to prevent contamination of the hot-extraction paper with fibres of a short length. This changeover is even undertaken a number of hours, preferably at least 3 hours before the start of production. The paper machine is here run in such a manner that no inherent brokes, no dry brokes and no trimmings are fed back into the pulp during production of the hot-extraction paper. These flows are conducted into what is known as an intermediate container during production.

The initial material is subjected to a high-consistency milling and subsequently a low-consistency milling, wherein, in the case of the high-consistency milling, the material density is set to be between 30% and 35% and, in the case of the low-consistency milling, is set to be between 4% and 6%. Furthermore, in the case of a high-consistency milling, the extension in the cross direction is controlled and the low-consistency milling is controlled in accordance with the achievement of the porosity (Gurley) >16 s. In the exemplary embodiment mentioned, the specific milling loads lie between 220-240 kWh/t in the high-consistency milling and 120-145 kWh/t in the low-consistency milling.

To vapour coat the hot-extraction paper, a conventional steam blow box is used, which applies the steam onto the paper with a pressure of at least 2.0 bar and a temperature of 152° C. A high-pressure hood is likewise used.

The paper machine is provided with a Foudrinier wire, particularly a Foudrinier wire section. The hot-extraction paper is pressed in a pressing section with two conventional nips and a shoe press with a pressure in the 1st nip of 60 kN/m, in the 2nd nip of 90 kN/m and in the shoe press with a pressure of 500 kN/m. The felt conditioning for the pressing section is carried out by means of Uhle boxes and high-pressure spray pipes. The Uhle box vacuums are operated at between 1.5 and 2 mWs and the high-pressure spray pipes are operated at 15 bar.

The drying of the hot-extraction paper takes place in a dryer section with slalom drying, contact drying and convection drying with hot air use of at least 170° C., at which the free shrinkage of the paper is allowed.

The drying takes place until a target value of 7% residual moisture is achieved.

The hot-extraction paper thus-produced had an
air permeability (Gurley) of 19.8 s
a bursting strength of 824 kPa/134 g.m$^{-2}$
a weight per unit area of 134 g/m$^2$ and
an elongation at break of 9.29% in the machine direction and 7.93% in the cross direction.

To investigate the properties, 2 g of the paper were subjected to a hot extraction by cooking with backflow with 100 ml water for 1 hour set up according to the standard: ISO 6588-2:2012

The fibre material was filtered off and chloride and aluminium ions were identified in the filtrate. It was shown that a chloride content of 0.63 mg/l and an aluminium content of 0.077 mg/l could be achieved.

Example 2

Production of a second hot-extraction paper according to the invention

Unbleached kraft sulphate cellulose, which was produced exclusively from 77% to 79% spruce and 21% to 23% pine wood with a Kappa number of 40, was used for producing the hot-extraction paper. 98% sulphuric acid was used exclusively to lower and set the pH value on a sack paper machine, which is run in a pseudo-neutral manner and has a maximum speed of >1000 m/min, and which was operated in particular for producing the hot-extraction paper at approximately 523 m/min. The resultant white water has a pH of 6.2 to approximately 7.5. Chemicals which are usually used in paper production, such as alum, starch, anti-sedimentation agents, anti-foaming agents, talc or sizing agents, must not be used and the corresponding additive openings of the machine are closed at least one hour before the production of the dry-extraction paper, in order reliably to prevent any residual quantity of these materials in the paper to be produced. Likewise, residual fibres are displaced to a different paper machine or to different reject containers, in order to prevent contamination of the hot-extraction paper with fibres of a short length. This changeover is even undertaken a number of hours, preferably at least 3 hours before the start of production. The paper machine is here run in such a manner that no inherent brokes, no dry brokes and no trimmings are fed back into the pulp during production of the hot-extraction paper. These flows are conducted into what is known as an intermediate container during production.

The initial material is subjected to a high-consistency milling and subsequently a low-consistency milling, wherein, in the case of the high-consistency milling, the material density is set to be between 30% and 35% and, in the case of the low-consistency milling, is set to be between 4% and 6%. Furthermore, in the case of a high-consistency milling, the extension in the cross direction is controlled and the low-consistency milling is controlled in accordance with the achievement of the porosity (Gurley) >16 s. In the exemplary embodiment mentioned, the specific milling loads lie between 210 and 230 kWh/t in the high-consistency milling and 110 and 135 kWh/t in the low-consistency milling.

To vapour coat the hot-extraction paper, a conventional steam blow box is used, which applies the steam onto the paper with a pressure of at least 2.0 bar and a temperature of 152° C. A high-pressure hood is likewise used.

The paper machine is provided with a Foudrinier wire, particularly a Foudrinier wire section. The hot-extraction paper is pressed in a pressing section with two conventional nips and a shoe press with a pressure in the 1st nip of 60 kN/m, in the 2nd nip of 90 kN/m and in the shoe press with a pressure of 500 kN/m. The felt conditioning for the pressing section is carried out by means of Uhle boxes and high-pressure spray pipes. The Uhle box vacuums are operated at between 1.5 and 2 mWs and the high-pressure spray pipes are operated at 15 bar.

The drying of the hot-extraction paper takes place in a dryer section with slalom drying, contact drying and convection drying with hot air use of at least 170° C., in the present case of on average 180° C., at which the free shrinkage of the paper is allowed.

The drying takes place until a target value of 7% residual moisture is achieved.

The hot-extraction paper thus-produced had an
air permeability (Gurley) of 21.3 s
a bursting strength of 788 kPa/129 g.m$^{-2}$
a weight per unit area of 129 g/m$^2$ and
an elongation at break of 8.92% in the machine direction and 8.16% in the cross direction.

To investigate the properties, 2 g of the paper were subjected to a hot extraction by cooking with backflow with 100 ml water for 1 h set up according to the standard: ISO 6588-2:2012

The fibre material was filtered off and chloride and aluminium ions were identified in the filtrate. It was shown that a chloride content of 0.52 mg/l and an aluminium content of 0.065 mg/l could be achieved.

Example 3

Production of a third hot-extraction paper according to the invention

Unbleached kraft sulphate cellulose, which was produced exclusively from 78% to 80% spruce and 20% to 22% pine wood with a Kappa number of 40, was used for producing the hot-extraction paper. 98% sulphuric acid was used exclusively to lower and set the pH value on a sack paper machine, which is run in a pseudo-neutral manner and has a maximum speed of >1000 m/min, in particular approximately 670 m/min. The resultant white water has a pH of 6.2 to approximately 7.5. Chemicals which are usually used in paper production, such as alum, starch, anti-sedimentation agents, anti-foaming agents, talc or sizing agents, must not be used and the corresponding additive openings of the machine are closed at least one hour before the production of the dry-extraction paper, in order reliably to prevent any residual quantity of these materials in the paper to be produced. Likewise, residual fibres are displaced to a different paper machine or to different reject containers, in order to prevent contamination of the hot-extraction paper with fibres of a short length. This changeover is even undertaken a number of hours, preferably at least 3 hours before the start of production. The paper machine is here run in such a manner that no inherent brokes, no dry brokes and no trimmings are fed back into the pulp during production of the hot-extraction paper. These flows are conducted into what is known as an intermediate container during production.

The initial material is subjected to a high-consistency milling and subsequently a low-consistency milling, wherein, in the case of the high-consistency milling, the material density is set to be between 30-35% and, in the case of the low-consistency milling, is set to be between 4-6%. Furthermore, in the case of a high-consistency milling, the extension in the cross direction is controlled and the low-consistency milling is controlled in accordance with the achievement of the porosity (Gurley) >16 s. In the exemplary embodiment mentioned, the specific milling loads lie between 200 to 220 kWh/t in the high-consistency milling and 120 to 145 kWh/t in the low-consistency milling.

To vapour coat the hot-extraction paper, a conventional steam blow box is used, which applies the steam onto the paper with a pressure of at least 2.0 bar and a temperature of 152° C. A high-pressure hood is likewise used.

The paper machine is provided with a Foudrinier wire, particularly a Foudrinier wire section. The hot-extraction paper is pressed in a pressing section with two conventional nips and a shoe press with a pressure in the 1st nip of 60 kN/m, in the 2nd nip of 90 kN/m and in the shoe press with a pressure of 550 kN/m. The felt conditioning for the pressing section is carried out by means of Uhle boxes and high-pressure spray pipes. The Uhle box vacuums are operated at between 1.5 and 2 mWs and the high-pressure spray pipes are operated at 15 bar.

The drying of the hot-extraction paper takes place in a dryer section with slalom drying, contact drying and convection drying with hot air use of at least 175° C., at which the free shrinkage of the paper is allowed.

The drying takes place until a target value of 7% residual moisture is achieved.

The hot-extraction paper thus-produced had an
air permeability (Gurley) of 20.3 s
a bursting strength of 671 kPa/102 g.m$^{-2}$
a weight per unit area of 102 g/m$^2$ and
an elongation at break of 9.12% in the machine direction and 8.21% in the cross direction.

To investigate the properties, 2 g of the paper were subjected to a hot extraction by cooking with backflow with 100 ml water for 1 h set up according to the standard: ISO 6588-2:2012

The fibre material was filtered off and chloride and aluminium ions were identified in the filtrate. It was shown that a chloride content of 0.56 mg/l and an aluminium content of 0.059 mg/l could be achieved.

Example 4

Production of a fourth hot-extraction paper according to the invention

Bleached kraft sulphate cellulose, which was produced from 61% to 65% spruce and 25% to 29% pine wood and 10% birch with a Kappa number of <5, was used for producing the hot-extraction paper. 98% sulphuric acid was used exclusively to lower and set the pH value on a sack paper machine, which is run in a pseudo-neutral manner and has a maximum speed of >1000 m/min, in particular approximately 560 m/min. The resultant white water has a pH of 6.2 to approximately 7.5. Chemicals which are usually used in paper production, such as alum, starch, anti-sedimentation agents, anti-foaming agents, talc or sizing agents, must not be used and the corresponding additive openings of the machine are closed at least one hour before the production of the dry-extraction paper, in order reliably to prevent any residual quantity of these materials in the paper to be produced. Likewise, residual fibres are displaced to a different paper machine or to different reject containers, in order to prevent contamination of the hot-extraction paper with fibres of a short length. This changeover is even undertaken a number of hours, preferably at least 3 hours before the start of production. The paper machine is here run in such a manner that no inherent brokes, no dry brokes and no trimmings are fed back into the pulp during production of the hot-extraction paper. These flows are conducted into what is known as an intermediate container during production.

The initial material is subjected to a high-consistency milling and subsequently a low-consistency milling, wherein, in the case of the high-consistency milling, the material density is set to be between 30-35% and, in the case of the low-consistency milling, is set to be between 4-6%. Furthermore, in the case of a high-consistency milling, the extension in the cross direction is controlled and the low-consistency milling is controlled in accordance with the achievement of the porosity (Gurley) >16 s. In the exemplary embodiment mentioned, the specific milling loads lie between 140 to 170 kWh/t in the high-consistency milling and 60 to 80 kWh/t in the low-consistency milling.

To vapour coat the hot-extraction paper, a conventional steam blow box is used, which applies the steam onto the paper with a pressure of at least 2.0 bar and a temperature of 152° C. A high-pressure hood is likewise used.

The paper machine is provided with a Foudrinier wire, particularly a Foudrinier wire section. The hot-extraction paper is pressed in a pressing section with two conventional nips and a shoe press with a pressure in the 1st nip of 60 kN/m, in the 2nd nip of 90 kN/m and in the shoe press with a pressure of 550 kN/m. The felt conditioning for the pressing section is carried out by means of Uhle boxes and high-pressure spray pipes. The Uhle box vacuums are operated at between 1.5 and 2 mWs and the high-pressure spray pipes are operated at 15 bar.

The drying of the hot-extraction paper takes place in a dryer section with slalom drying, contact drying and convection drying with hot air use of at least 175° C., at which the free shrinkage of the paper is allowed.

The drying takes place until a target value of 7% residual moisture is achieved.

The hot-extraction paper thus-produced had an
air permeability (Gurley) of 22.1 s
a bursting strength of 604 kPa/131 g.m$^{-2}$
a weight per unit area of 131 g/m$^2$ and
an elongation at break of 9.16% in the machine direction and 9.48% in the cross direction.

To investigate the properties, 2 g of the paper were subjected to a hot extraction by cooking with backflow with 100 ml water for 1 hour set up according to the standard: ISO 6588-2:2012

The fibre material was filtered off and chloride and aluminium ions were identified in the filtrate. It was shown that a chloride content of 0.55 mg/l and an aluminium content of 0.074 mg/l could be achieved.

Example 5

Production of a fifth hot-extraction paper according to the invention

Bleached kraft sulphate cellulose, which was produced from 61% to 65% spruce and 25% to 29% pine wood and 10% birch with a Kappa number of <5, was used for producing the hot-extraction paper. 98% sulphuric acid was used exclusively to lower and set the pH value on a sack paper machine, which is run in a pseudo-neutral manner and has a maximum speed of >1000 m/min, in particular approximately 960 m/min. The resultant white water has a pH of 6.2 to approximately 7.5. Chemicals which are usually used in paper production, such as alum, starch, anti-sedimentation agents, anti-foaming agents, talc or sizing agents, must not be used and the corresponding additive openings of the machine are closed at least one hour before the production of the dry-extraction paper, in order reliably to prevent any residual quantity of these materials in the paper to be produced. Likewise, residual fibres are displaced to a different paper machine or to different reject containers, in order to prevent contamination of the hot-extraction paper with fibres of a short length. This changeover is even undertaken a number of hours, preferably at least 3 hours before the start of production. The paper machine is here run in such a manner that no inherent brokes, no dry brokes and no trimmings are fed back into the pulp during production of the hot-extraction paper. These flows are conducted into what is known as an intermediate container during production.

The initial material is subjected to a high-consistency milling and subsequently a low-consistency milling, wherein, in the case of the high-consistency milling, the material density is set to be between 30-35% and, in the case of the low-consistency milling, is set to be between 4-6%. Furthermore, in the case of a high-consistency milling, the extension in the cross direction is controlled and the low-consistency milling is controlled in accordance with the achievement of the porosity (Gurley) >16 s. In the exemplary embodiment mentioned, the specific milling loads lie between 100 to 120 kWh/t in the high-consistency milling and 110 to 130 kWh/t in the low-consistency milling.

To vapour coat the hot-extraction paper, a conventional steam blow box is used, which applies the steam onto the paper with a pressure of at least 2.0 bar and a temperature of 152° C. A high-pressure hood is likewise used.

The paper machine is provided with a Foudrinier wire, particularly a Foudrinier wire section. The hot-extraction paper is pressed in a pressing section with two conventional nips and a shoe press with a pressure in the 1st nip of 60 kN/m, in the 2nd nip of 90 kN/m and in the shoe press with a pressure of 550 kN/m. The felt conditioning for the pressing section is carried out by means of Uhle boxes and high-pressure spray pipes. The Uhle box vacuums are operated at between 1.5 and 2 mWs and the high-pressure spray pipes are operated at 15 bar.

The drying of the hot-extraction paper takes place in a dryer section with slalom drying, contact drying and convection drying with hot air use of at least 175° C., at which the free shrinkage of the paper is allowed.

The drying takes place until a target value of 7% residual moisture is achieved.

The hot-extraction paper thus-produced had an
air permeability (Gurley) of 20.1 s
a bursting strength of 327 kPa/71 g.m$^{-2}$
a weight per unit area of 71 g/m$^2$ and
an elongation at break of 9.03% in the machine direction and 9.51% in the cross direction.

To investigate the properties, 2 g of the paper were subjected to a hot extraction by cooking with backflow with 100 ml water for 1 hour set up according to the standard: ISO 6588-2:2012

The fibre material was filtered off and chloride and aluminium ions were identified in the filtrate. It was shown that a chloride content of 0.52 mg/l and an aluminium content of 0.069 mg/l could be achieved.

The invention claimed is:

1. A hot-extraction paper consisting substantially of cellulose and manufacturing assistants needed in cellulose production, such as pH modifiers based on acids or bases, wherein the paper comprises exclusively cellulose having fibre lengths of at least 2.0 mm on length-weighted average, and the paper has isotropic extension properties which are substantially equal in machine and cross directions and amount to at least 7.5%.

2. The hot-extraction paper according to claim 1, wherein sulphuric acid ($H_2SO_4$) or caustic soda (NaOH) is the pH modifier.

3. The hot-extraction paper according to claim 1, wherein the cellulose is chosen from cellulose from coniferous woods, selected from the group of fir, spruce, pine, larch, Douglas fir or mixtures of two or more thereof.

4. The hot-extraction paper according to claim 3, wherein up to 15%, of the cellulose made up of coniferous woods is replaced by cellulose from deciduous woods, selected from the group of beech, oak, European aspen, poplar, acacia, alder, maple, chestnut, tupelo, plane, lime, eucalyptus or mixtures of two or more thereof.

5. The hot-extraction paper according to claim 1, wherein the extension properties in the machine direction (MD) deviate at most by 1.5% from those in the cross direction (CD).

6. The hot-extraction paper according to claim 1, wherein the paper has weights per unit area of between 70 and 250 g/m$^2$.

7. The hot-extraction paper according to claim 1, wherein the paper has an air permeability according to Gurley of between 15 s and 25 s.

8. The hot-extraction paper according to claim 1, wherein a chloride content of a water extract from the hot-extraction paper is below 0.7 mg/l and an aluminium content of a water extract from the hot-extraction paper is below 0.1 mg/l.

9. The hot-extraction paper according to claim 1, wherein the paper has a burst resistance of at least 630 kPa/100 g.m$^{-2}$.

10. The hot-extraction paper according to claim 1, wherein the hot-extraction paper having a deciduous wood portion has a burst resistance of at least 400 kPa/100 g.m$^{-2}$.

11. The hot-extraction paper according to claim 1, wherein the hot-extraction paper is compressed and, if appropriate additionally calendered.

12. The hot-extraction paper according to claim 1, wherein the surface energy of the hot-extraction paper is >33 mJ/m$^2$.

* * * * *